US011130380B2

(12) United States Patent
Johnson

(10) Patent No.: US 11,130,380 B2
(45) Date of Patent: Sep. 28, 2021

(54) WEAR DISC FOR SUSPENSION

(71) Applicant: Caterpillar Inc., Deerfield, IL (US)

(72) Inventor: John Al Johnson, Hawley, MN (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 16/134,585

(22) Filed: Sep. 18, 2018

(65) Prior Publication Data
US 2020/0086706 A1 Mar. 19, 2020

(51) Int. Cl.
*B60G 7/02* (2006.01)
*B62D 65/02* (2006.01)
*B60S 5/00* (2006.01)
*F16F 1/373* (2006.01)
*B62D 33/02* (2006.01)

(52) U.S. Cl.
CPC .............. *B60G 7/02* (2013.01); *B60S 5/00* (2013.01); *B62D 33/02* (2013.01); *B62D 65/02* (2013.01); *F16F 1/3737* (2013.01); *B60G 2204/143* (2013.01); *B60G 2204/4104* (2013.01); *B60G 2204/4402* (2013.01)

(58) Field of Classification Search
CPC ........ B60G 2204/128; B60G 2204/129; B60G 2204/4304; B60G 7/02; B60G 2204/143; B60G 2204/4104; B60S 5/00; B62D 33/02; B62D 65/02; F16C 11/04

USPC ....................................................... 280/124.4
See application file for complete search history.

(56) References Cited

U.S. PATENT DOCUMENTS

| 3,687,488 | A | * | 8/1972 | Tabor | F16C 7/06 403/59 |
| 4,756,512 | A | * | 7/1988 | Toms, Jr. | B60G 11/22 188/284 |
| 5,037,126 | A | * | 8/1991 | Gottschalk | B60G 9/003 280/124.116 |
| 6,375,205 | B1 | * | 4/2002 | De Fontenay | F16D 3/28 280/93.502 |
| 7,207,583 | B2 | | 4/2007 | Ross et al. | |
| 7,267,348 | B1 | * | 9/2007 | Klein | B60G 9/003 280/124.1 |
| 2003/0132593 | A1 | * | 7/2003 | Ross | B60G 7/02 280/124.1 |
| 2006/0244234 | A1 | * | 11/2006 | Ramsey | B60G 5/047 280/124.131 |
| 2015/0078808 | A1 | * | 3/2015 | Halcom | F16C 11/045 403/119 |
| 2016/0176257 | A1 | * | 6/2016 | Fratini | F16F 1/3735 280/124.11 |

* cited by examiner

*Primary Examiner* — James A Shriver, II
*Assistant Examiner* — Hilary L Johns
(74) *Attorney, Agent, or Firm* — Law Office of Kurt J. Fugman LLC

(57) ABSTRACT

A method includes inserting a wear disc into the void between the eye portion of a strut and the yoke arrangement of a chassis or an undercarriage.

18 Claims, 4 Drawing Sheets

WEAR DISC FOR SUSPENSION

TECHNICAL FIELD

The present disclosure relates to suspensions used on earth moving, construction, and mining equipment and the like. Specifically, the present disclosure relates to suspensions that have components that prolong the useful life of the suspension or that may reduce the cost of repairing such suspensions.

BACKGROUND

Machines, such as haul trucks are routinely used in the earth moving, construction, and mining industries, etc. to move heavy payloads. These haul trucks are equipped with a suspensions that are intended to support these heavy payloads. Such suspensions often employ shock absorbers or struts that have a fluid contained within them for supporting these loads in resilient manner.

The eye portion of the strut may mate with a yoke of the frame or chassis of the machine, or alternatively, with the yoke of the undercarriage of the machine. Either eye portion of the strut has an aperture that may align with an aperture(s) of the yoke of the frame or chassis or the yoke of the undercarriage of the machine. In either case, a pin may be inserted into the apertures to form a working joint. More particularly, the rod end of the strut and the cylinder portion of the strut both have eye portions that are similarly configured and that are intended to mate with similar yoke structures of the frame or chassis of the machine and of the undercarriage. Once the pin is installed, a spherical or "ball" type bearing joint is created. As the machine moves, the suspension may also move up and down, creating angular motion between the boss of the yoke of the frame or chassis and/or the yoke of the undercarriage of the machine and the associated eye portion of the strut. A boss is provided that contacts the eye portion of the strut and that is intended to wear over time.

If the wear reaches a small or moderate level, then the boss may be rebuilt using metallurgical repair and then machined back to the original profile of the boss. On the other hand, if the wear reaches a heavy level, then the yoke of the frame or the undercarriage or the strut itself may be scrapped.

U.S. Pat. No. 7,207,583 to Ross et al. discloses a spacer apparatus for insulating a beam bushing assembly of an axle/suspension system from direct metal-to-metal contact with the vehicle frame hanger on which the assembly is pivotally mounted. In one embodiment, an integrally formed one-piece apparatus includes a spacer disk portion and collar portions, whereby the collars provide a complementary fit of the spacer apparatus on the bushing assembly mounting tube, and generally prevents or minimizes relative movement between the spacer disk and bushing assembly. In other embodiments, one or more load dissipation structures mounted on or forming a part of the beam and/or its bushing assembly prevent substantially non-planar surfaces of the assembly from contacting a spacer disk by increasing the bearing area of those surfaces which contact the disk. These apparatus allegedly generally eliminate excessive wear or damage to the spacer disk and possible resulting damage to the axle/suspension system.

However, this reference fails to disclose a robust method for prolonging the useful life of a suspension such as the struts of a heavy haul truck.

SUMMARY

A suspension according to an embodiment of the present disclosure comprises a chassis or an undercarriage including a first yoke arrangement, a strut including a first eye portion, and a first wear disc disposed between the first eye portion and the first yoke arrangement.

A machine according to an embodiment of the present disclosure comprises an implement system, a chassis or an undercarriage including a first yoke arrangement, a strut including a first eye portion, a first wear disc disposed between the first eye portion and the first yoke arrangement, and a pin mating with the first eye portion and the first yoke arrangement.

A method for remanufacturing a suspension or providing a new suspension according to an embodiment of the present disclosure is provided. The method may comprise inserting a wear disc into the void between the eye portion of a strut and the yoke arrangement of a chassis or an undercarriage.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
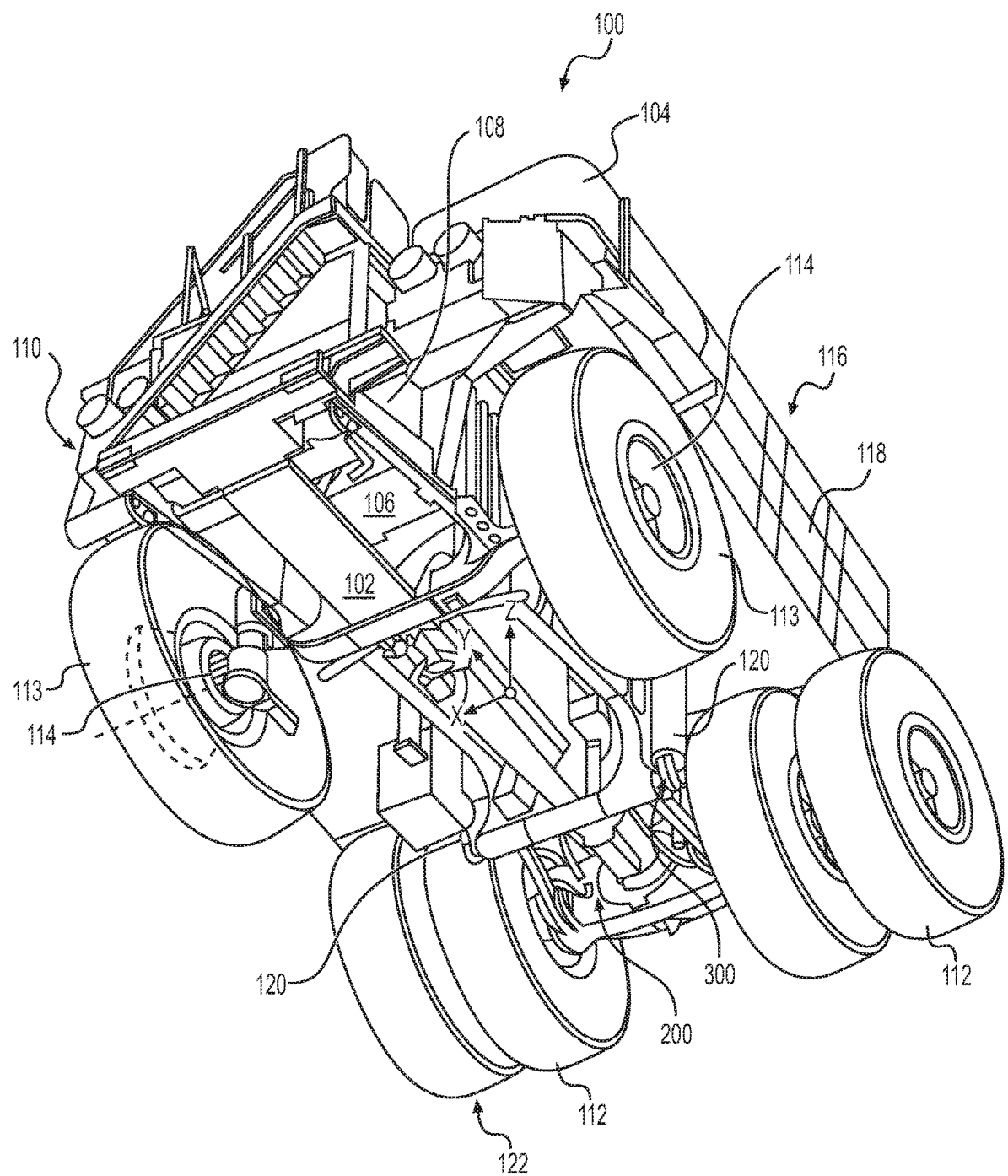
FIG. 1 is a bottom perspective view of a machine in the form of a haul truck that employs a suspension employing a wear disc according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for providing a suspension or a machine having a suspension using a wear disc according to various embodiments of the present disclosure will now be described. FIGS. 1 thru 5 show an embodiment of a machine 100 in the form of a haul truck that includes a suspension 200 including a wear disc 300 constructed in accordance with principles of the present disclosure.

Focusing on FIG. 1, the machine 100 includes a chassis 102 and an operator cabin 104 mounted on the chassis 102. The operator cabin 104 may include control elements, such as a joystick, steering wheel, etc. for controlling operations of the machine 100. A powertrain including a power source 106 is disposed in the machine 100 to supply power for performing various operations of the machine 100. The power source 106 may be, but not limited to, an internal combustion engine, a hybrid engine, and non-conventional power sources such as batteries and fuel cells. The powertrain (not clearly shown) may further include a transmission unit for transmission of the power from the power source to an undercarriage 122 set of ground engaging members 112 (such as tires 113, which may be attached to the wheels 114). In an alternative embodiment, the set of ground engaging members 112 may be tracks powered by a drive sprocket, etc.

The machine 100 may further includes an implement system 116 coupled to the chassis 102. The implement system 116 may be configured to manipulate, move, or store work material (e.g. a bucket, a haul bed 118) and may be pivotally coupled to chassis 102. A set of rear struts 120 are also shown that form a part of the suspension and the presence of a wear disc 300 is pointed out (not clearly shown in FIG. 1).

While the arrangement is illustrated in connection with a haul truck, the arrangement disclosed herein has universal applicability in various other types of machines commonly used in the construction, mining or earthmoving industries. The term "machine" may refer to any machine that performs some type of operation associated with an industry such as mining, earth moving or construction, or any other industry known in the art. For example, the machine may be an excavator, wheel loader, bulldozer, grader, etc. Moreover, one or more implements (e.g. a bucket, a haul bed) may be connected to the machine. Such implements may be utilized for a variety of tasks, including, for example, manipulating a work material such as the ground, dirt, rocks, etc.

Turning now to FIGS. 2 thru 5, a suspension 200 according to an embodiment of the present disclosure will now be discussed. The suspension may comprise a chassis 102 or an undercarriage (e.g. 122 in FIG. 1) including a first yoke arrangement 202, and a strut 204 (such as a rear strut but may also be a forward strut) including a first eye portion 206 configured to mate with the first yoke arrangement 202, and a first wear disc 300 disposed between the first eye portion 206 and the first yoke arrangement 202.

Figure 2:
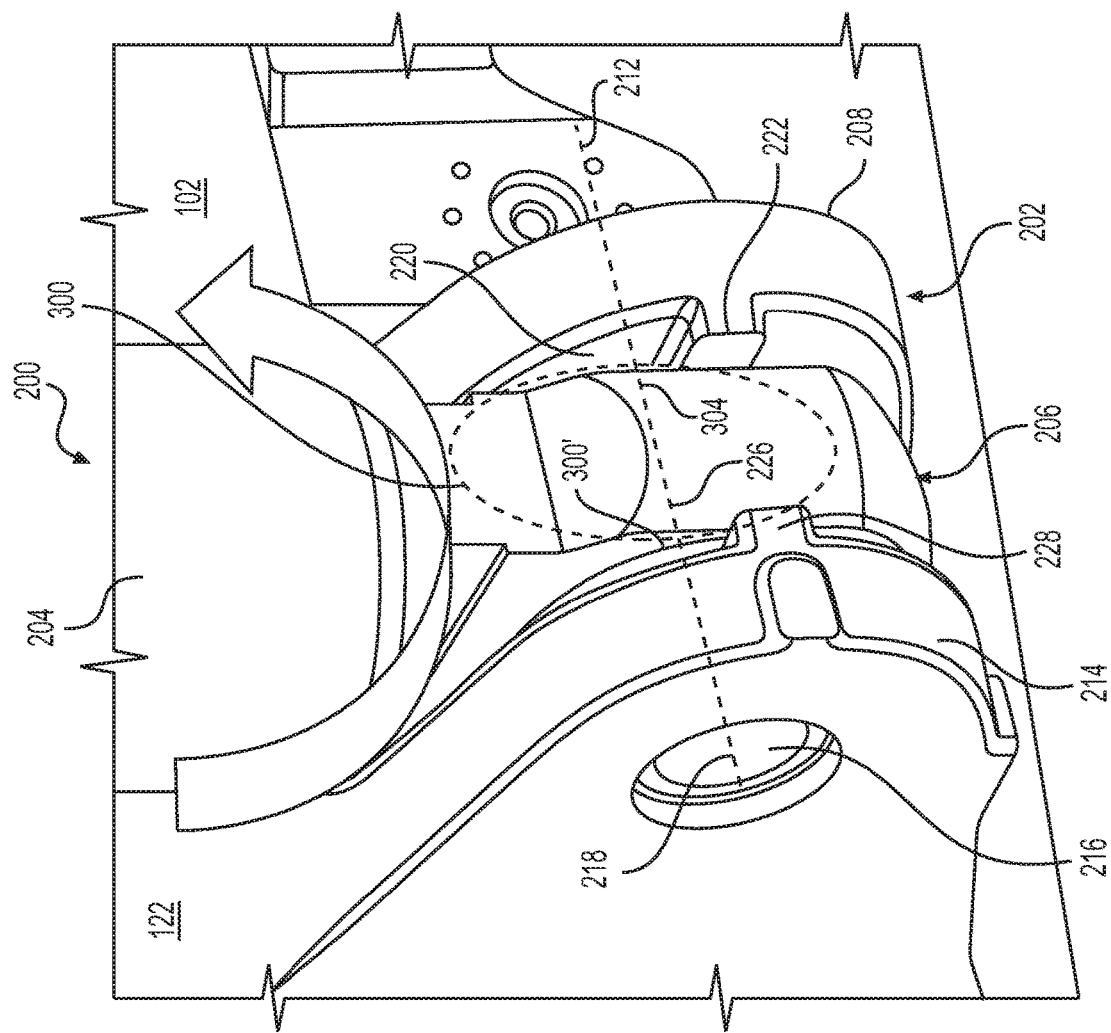
FIG. 2 is a perspective view of a portion of the rod portion of a strut, showing the suspension of the machine of FIG. 1 (e.g. a haul truck) employing a wear disc according to an embodiment of the present disclosure more clearly.
Figure 5:
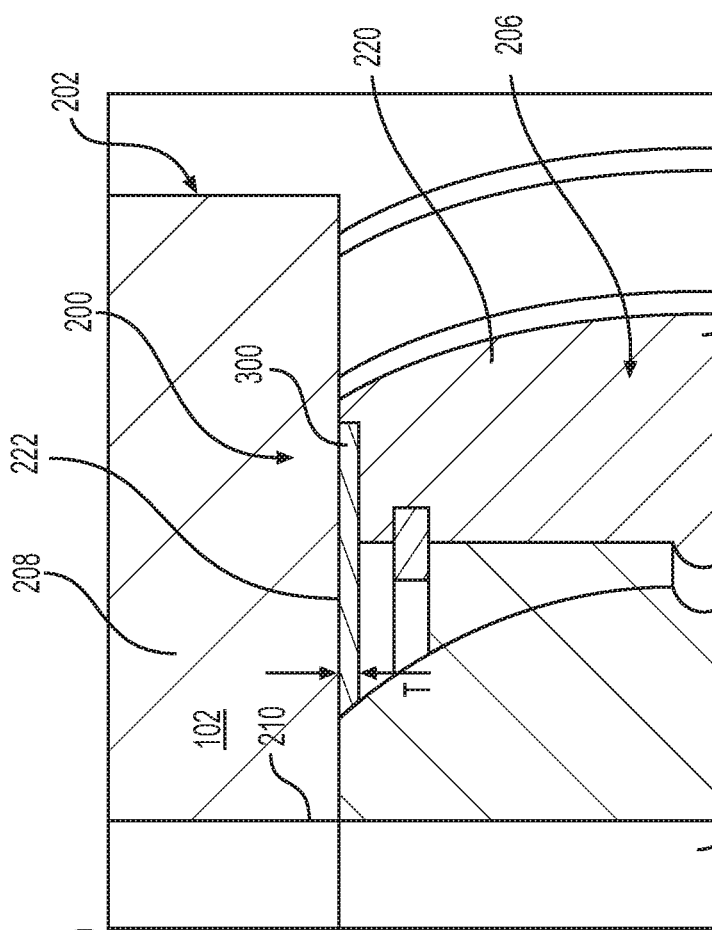
FIG. 5 is an enlarged detail view showing the use of a wear disc in the suspension of FIG. 4.

As best seen in FIG. 2, the first yoke arrangement 202 forms a part of the chassis 102 but it may be part of the undercarriage 122 in other embodiments. A pin 230 is provided that is configured to mate with the first wear disc 300, the first eye portion 206, and the first yoke arrangement 202. The first yoke arrangement 202 may include a first lug 208 defining a first aperture 210 having a first longitudinal axis 212 and a second lug 214 defining a second aperture 216 having a second longitudinal axis 218 that is aligned with the first longitudinal axis 212. The first lug 208 and the second lug 214 may define a void 220 between the first lug 208 and the second lug 214 configured to receive the first eye portion 206.

The suspension 200 may further comprise a first boss 222 disposed on the first lug 208 proximate the first aperture 210 in the void 220 and the wear disc 300 may be disposed between the first lug 208 and the first eye portion 206. Looking at FIGS. 4 and 5, the first eye portion 206 defines a third aperture 224 having a third longitudinal axis 226 that is aligned with the first longitudinal axis 212 and the second longitudinal axis 218. The wear disc 300 also defines a fourth aperture 302 having a fourth longitudinal axis 304 that is aligned with the first longitudinal axis 212, the second longitudinal axis 218, the third longitudinal axis 226, and the fourth longitudinal axis 304.

Figure 3:
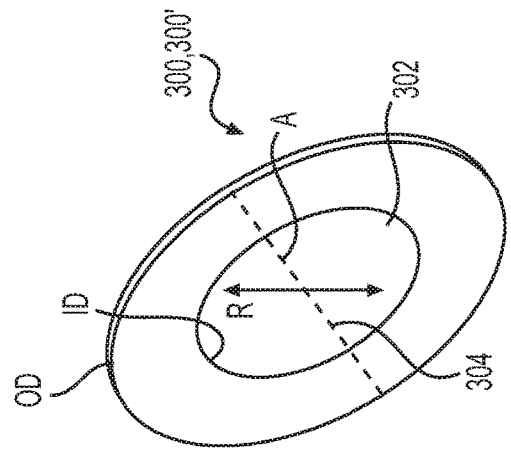
FIG. 3 is a perspective view of the wear disc of FIG. 2 shown in isolation for enhanced clarity.

Focusing on FIG. 3, the wear disc 300 includes a cylindrical annular configuration defining a radial direction R, and an axial direction A that is parallel to the fourth longitudinal axis 304. The fourth aperture 302 defines an inside diameter ID. The wear disc 300 further defines an outside diameter OD, and the wear disc 300 further defines an axial thickness T (see FIG. 5).

In some embodiments such as for the machine shown in FIG. 1, the inside diameter ID may range from 90 mm to 200 mm, the outside diameter OD may range from 170 mm to 290 mm, and the axial thickness T may range from 2.5 mm to 4 mm. In other embodiments, the OD may be approximately 195 mm, the ID may be approximately 111 mm, and the thickness T may be approximately 2.5 mm. The wear disc 300 may be differently configured or dimensioned than what is specifically shown or described herein in other embodiments.

Returning to FIGS. 2 and 4, the suspension 200 may further comprise a second boss 228 disposed on the second lug 214 proximate the second aperture 216 in the void 220 and a second wear disc 300' that is disposed between the second lug 214 and the first eye portion 206. In some embodiments, the first wear disc 300 and the second wear disc 300' are identically configured but not necessarily so in other embodiments.

Referring now to FIGS. 1 thru 5, a machine 100 according to an embodiment of the present disclosure may comprise an implement system 116, a chassis 102 or an undercarriage 122 including a first yoke arrangement 202, and a strut 204 including a first eye portion 206 configured to mate with the first yoke arrangement 202, and a first wear disc 300 disposed between the first eye portion 206 and the first yoke arrangement 202. In some embodiments, the implement system 116 includes a haul bed 118 but other implement systems such as buckets may be employed in other embodiments.

In some embodiments, the first yoke arrangement 202 forms a part of the undercarriage 122 but may form part of the chassis 102 in other embodiments. It is to be understood that the cylinder portion of the strut and the rod portion of the strut may have similarly configured eye portions in various embodiments.

Figure 4:
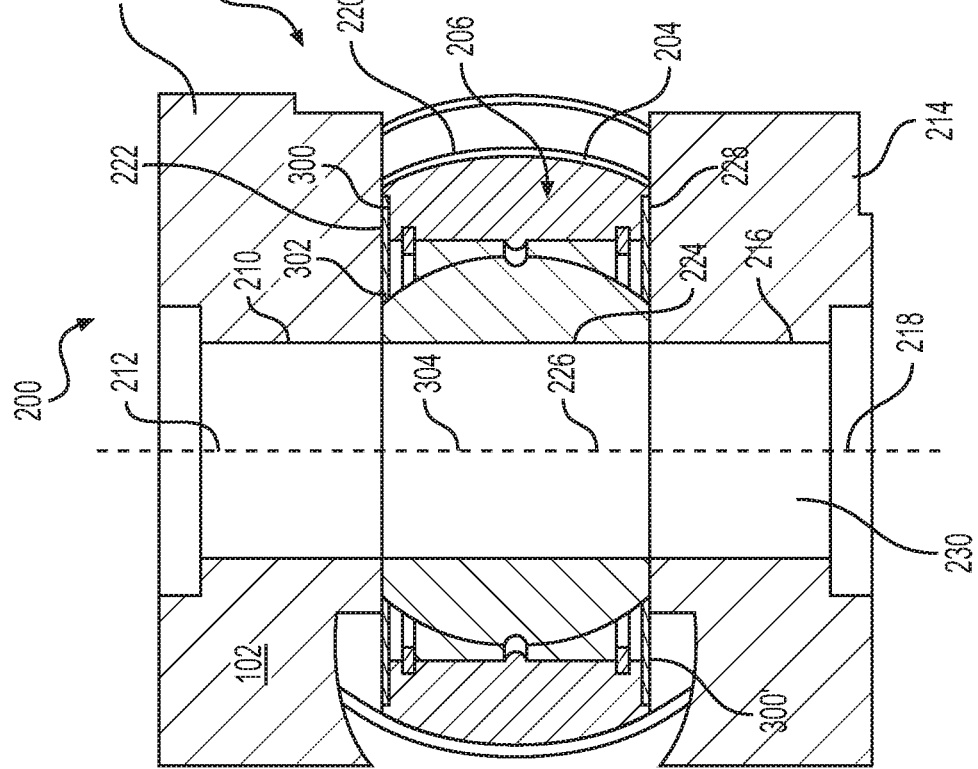
FIG. 4 is a top cross-sectional view of the suspension of FIG. 2 showing the joint created using a wear disc.

The first yoke arrangement 202 may include a first lug 208 defining a first aperture 210 having a first longitudinal axis 212 and a second lug 214 defining a second aperture 216 having a second longitudinal axis 218 that is aligned with the first longitudinal axis 212. The first lug 208 and the second lug 214 may define a void 220 between the first lug 208 and the second lug 214 configured to receive the first eye portion 206. A pin 230 is shown in FIG. 4 that completes the joint. That is to say, the pin is inserted into the apertures of the wear disc, the first eye portion, and the first yoke arrangement alluded to earlier herein.

The machine 100 may further comprise a first boss 222 disposed on the first lug 208 proximate the first aperture 210 in the void 220 and the wear disc 300 is disposed between the first lug 208 and the first eye portion 206. The first eye portion 206 defines a third aperture 224 having a third longitudinal axis 226 that is aligned with the first longitudinal axis 212 and the second longitudinal axis 218. The wear disc 300 defines a fourth aperture 302 having a fourth longitudinal axis 304 that is aligned with the first longitudinal axis 212, the second longitudinal axis 218, the third longitudinal axis 226, and the fourth longitudinal axis 304. As already mentioned, the pin 230 is inserted into these apertures to complete the joint.

One or more wear discs 300, 300' may be provided with the machine 100 that are configured as previously described herein or that may be differently configured from each other what is specifically shown in the drawings. The wear disc may be made from any suitable material including any thermoplastic or thermoset material. Exemplary materials include nylon, PU, etc.

The term "chassis" as used herein should be interpreted to include any permanent, or pseudo-permanent part of the machine. Therefore, the chassis may include any portion of the machine fixed relative to the power source, etc.

Any of the dimensions, configurations, materials, material properties, etc. discussed herein may be varied as needed or desired to be different than any value or characteristic specifically mentioned herein or shown in the drawings.

INDUSTRIAL APPLICABILITY

In practice, a wear disc, a kit including one or more wear discs and one or more struts, a suspension using a wear disc or a machine having a suspension utilizing a wear disc according to any embodiment described herein may be sold, bought, manufactured or otherwise obtained in an OEM (original equipment manufacturer) or after-market context.

Figure 6:
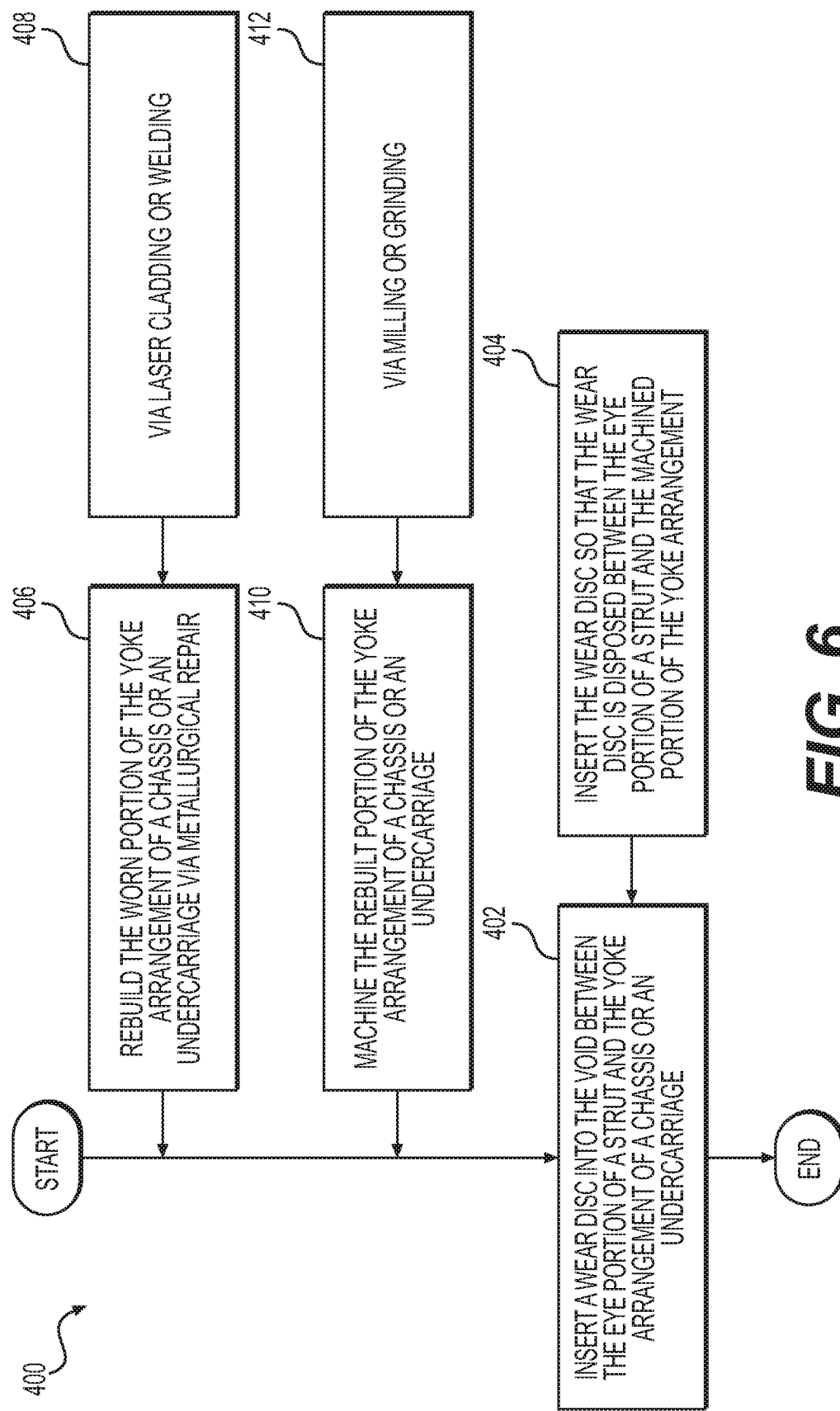
FIG. 6 contains a flowchart depicting a method for remanufacturing a suspension according to an embodiment of the present disclosure.

Referring now to FIG. 6, a method 400 for remanufacturing a suspension providing a new suspension will now be described. The method 400 may comprise inserting a wear disc into the void between the eye portion of a strut and the yoke arrangement of a chassis or an undercarriage (step 402). This may be done when the suspension or machine is new or after it has been used.

In certain embodiments, this inserting step is performed such that the wear disc is disposed between the eye portion of a strut and the machined portion of the yoke arrangement such as when the suspension is being remanufactured (step 404). In such a case, the method 400 may further comprise rebuilding the worn portion of the yoke arrangement of a chassis or an undercarriage via metallurgical repair (step 406). Rebuilding may include using laser cladding or welding, etc. (step 408).

After rebuilding, the method 400 may further comprise machining the rebuilt portion of the yoke arrangement of a chassis or an undercarriage (step 410). Types of machining include milling, grinding, etc. (step 412).

Then, the method 400 may include inserting the wear disc so that the wear disc is disposed between the eye portion of a strut and the machined portion of the yoke arrangement as previously mentioned (step 404).

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A suspension comprising:
   a chassis or an undercarriage including a first yoke arrangement;
   a strut including a first eye portion; and
   a first wear disc disposed between the first eye portion and the first yoke arrangement;
   wherein the first wear disc defines a wear disc outside diameter, and a wear disc thickness that is less than half of the wear disc outside diameter, and the wear disc contacts the first eye portion of the strut and the first yoke arrangement.

2. The suspension of claim 1 further comprising a pin mating with the first wear disc, the first eye portion, and the first yoke arrangement;
   wherein the first yoke arrangement forms a part of the undercarriage.

3. The suspension of claim 1 wherein the first yoke arrangement includes a first lug defining a first aperture having a first longitudinal axis and a second lug defining a second aperture having a second longitudinal axis that is aligned with the first longitudinal axis, the first lug and the second lug defining a void between the first lug and the second lug.

4. The suspension of claim 3 further comprising a first boss disposed on the first lug proximate the first aperture in the void and the wear disc is disposed between the first lug and the first eye portion.

5. The suspension of claim 4 wherein the first eye portion defines a third aperture having a third longitudinal axis that is aligned with the first longitudinal axis and the second longitudinal axis and the wear disc defines a fourth aperture having a fourth longitudinal axis that is aligned with the first longitudinal axis, the second longitudinal axis, the third longitudinal axis, and the fourth longitudinal axis.

6. The suspension of claim 5 wherein the wear disc includes a cylindrical annular configuration defining a radial direction, and an axial direction parallel to the fourth longitudinal axis, the fourth aperture defines a fourth aperture inside diameter, and the wear disc thickness is defines a wear disc axial thickness.

7. The suspension of claim 6 wherein the fourth aperture inside diameter ranges from 90 mm to 200 mm, the wear disc outside diameter ranges from 170 mm to 290 mm, and the wear disc axial thickness ranges from 2.5 mm to 4 mm.

8. The suspension of claim 7 further comprising a second boss disposed on the second lug proximate the second aperture in the void and a second wear disc that is disposed between the second lug and the first eye portion.

9. The suspension of claim 8 wherein the first wear disc and the second wear disc are identically configured.

10. A machine comprising:
    an implement system;
    a chassis or an undercarriage including a first yoke arrangement;

a strut including a first eye portion;

a first wear disc disposed between the first eye portion and the first yoke arrangement, and the first wear disc engages the first eye portion and the first yoke arrangement simultaneously; and a pin mating with the first eye portion and the first yoke arrangement.

11. The machine of claim 10 wherein the implement system includes a haul bed.

12. The machine of claim 10 wherein the first yoke arrangement forms a part of the undercarriage.

13. The machine of claim 10 wherein the first yoke arrangement includes a first lug defining a first aperture having a first longitudinal axis and a second lug defining a second aperture having a second longitudinal axis that is aligned with the first longitudinal axis, the first lug and the second lug defining a void between the first lug and the second lug.

14. The machine of claim 13 further comprising a first boss disposed on the first lug proximate the first aperture in the void and the wear disc is disposed between the first lug and the first eye portion.

15. The machine of claim 14 wherein the first eye portion defines a third aperture having a third longitudinal axis that is aligned with the first longitudinal axis and the second longitudinal axis and the wear disc defines a fourth aperture having a fourth longitudinal axis that is aligned with the first longitudinal axis, the second longitudinal axis, the third longitudinal axis, and the fourth longitudinal axis.

16. The machine of claim 15 wherein the wear disc includes a cylindrical annular configuration defining a radial direction, and an axial direction parallel to the fourth longitudinal axis, the fourth aperture defines a fourth aperture inside diameter, the disc further defines a wear disc outside diameter, and the disc further defines a wear disc axial thickness.

17. The machine of claim 16 wherein the fourth aperture inside diameter ranges from 90 mm to 200 mm, the wear disc outside diameter ranges from 170 mm to 290 mm, and the wear disc axial thickness ranges from 2.5 mm to 4 mm.

18. The machine of claim 17 further comprising a second boss disposed on the second lug proximate the second aperture in the void and a second wear disc that is disposed between the second lug and the first eye portion.

* * * * *